United States Patent [19]
Patterson

[11] 3,912,302

[45] Oct. 14, 1975

[54] SELF-COUPLING HITCH

[76] Inventor: Ethredge T. Patterson, 18660 Santa Fe, Shafter, Calif. 93263

[22] Filed: Sept. 23, 1974

[21] Appl. No.: 508,508

[52] U.S. Cl. .............................. 280/477; 280/508
[51] Int. Cl.² .......................................... B60D 1/10
[58] Field of Search ........................ 280/477, 508

[56] References Cited
UNITED STATES PATENTS

| 827,431 | 7/1906 | Evensen | 280/477 |
| 2,441,285 | 5/1948 | Pfeiffer | 280/477 |
| 2,478,736 | 8/1949 | Balzer | 280/477 |

FOREIGN PATENTS OR APPLICATIONS

| 906,662 | 3/1954 | Germany | 280/477 |
| 1,045,663 | 4/1951 | France | 280/508 |

*Primary Examiner*—Leo Friaglia
*Attorney, Agent, or Firm*—Huebner & Worrel

[57] ABSTRACT

An improved self-coupling hitch including a lug adapted to be mounted on a towable vehicle and a receiver adapted to be mounted on a towing vehicle. The lug is characterized by a substantially disk-shaped configuration circumscribed by an annular bearing and an eccentric pin-receiving relief of an arcuate configuration. The receiver is an open-end receiver characterized by an internal surface of substantially funnelform configuration which terminates in a lug receiving seat having a radius of curvature substantially equal to the radius of said annular bearing, a spring-loaded, axially displaceable coupling pin, a latching mechanism for restraining the coupling pin against axial displacement, and a release mechanism responsive to an engagement therewith by said lug for releasing said coupling pin for axial displacement through said pin-receiving relief.

8 Claims, 5 Drawing Figures

SELF-COUPLING HITCH

BACKGROUND OF THE INVENTION

The invention generally relates to hitches and more particularly to an improved self-coupling hitch for automatically coupling vehicles in a towing/towed relationship.

The prior art, of course, is replete with hitches, towbars, clevises, and similar devices particualrly suited for coupling a towable vehicle, such as a trailer, with a towing vehicle such as a tractor, truck or the like.

As can be appreciated by those familiar with various industries in which trucks, tractors, trailers, wagons, and other types of similar vehicles must be coupled with a towing vehicle, a great deal of time and effort frequently is expended in achieving the desired coupling. Moreover, in certain industries, a single towing vehicle is coupled with a multiplicity of towable vehicles in rapid succession. Consequently, hitches which require manual manipulation in order to achieve the required coupling simply do not adequately meet existing needs.

Moreover, in many instances, the connecting link, or tongue, is both heavy and awkward to manipulate. This problem is magnified in those instances where the receiver, mounted on the towing vehicle, is in misalignment with the lug, affixed to the tongue, since the tongue and the towing vehicle must be reoriented before a coupling of the towed and towing vehicles can be effected.

Attempts heretofore have been made to utilize hitches characterized by funnel-like receivers mounted on drawbars for receiving couplings affixed to the distal ends of tongues and similar connecting links. One such hitch is disclosed in U.S. Pat. No. 1,939,463 which issued Dec. 12, 1933. Unfortunately, when employing a hitch which includes a lug affixed to the distal end of a tongue and configured to be received within a funnel-like receiver, the friction developed between the contiguous surfaces of the lug and the receiver often results in extensive damage being done to the tongue as well as to the receiver.

Additionally, in many instances motion accidentially is imparted to the towed vehicle, through an engagement of the lug with the receiver. Unfortunately, such motion tends to subject personnel in the immediate vicinity of the vehicles to injury.

It is, therefore, the general purpose of the instant invention to provide an improved self-coupling hitch through which a coupling of vehicles to be towed with towing vehicles is expeditiously effected with increased efficiency and safety.

OBJECTS AND SUMMARY OF THE INVENTION

It is therefore an object of the instant invention to provide a hitch which overcomes the aforementioned difficulties and disadvantages.

It is another object to provide an improved self-coupling hitch through which a coupling of vehicles can safely be expedited.

It is another object to provide an improved self-coupling hitch including a receiver adapted to be mounted on a towing vehicle and a bearing supported lug adapted to be mounted at the distal end of a connecting link for a towable vehicle.

It is another object to provide an improved self-coupling hitch which includes an open-end receiver of a funnelform configuration terminating in a lug-receiving seat and adapted to be mounted on a towing vehicle, a lug adapted to be affixed to the distal end of a tongue projected from a vehicle to be coupled with the towing vehicle, and a bearing of an annular configuration circumscribing the lug for supporting the lug in rolling engagement with the receiver as the lug and receiver are mated in a coupling relationship.

It is another object to provide an improved self-coupling hitch characterized by a lug of a substantially disk-shaped configuration adapted to be mounted at the distal end of a connecting link projected from a towable vehicle, an open-end receiver of a funnel-form configuration for receiving the lug and adapted to be mounted on a towing vehicle, and a lug-capturing mechanism mounted in juxtaposition with the receiver for capturing the lug in response to a reception of the lug by said receiver, and an annular bearing supporting said lug for rolling motion along the interior surfaces of said receiver.

These and other objects and advantages are achieved through a self-coupling hitch which includes a lug of a substantially disk-shaped configuration circumscribed by an annular bearing, supported for circular motion relative to the lug, having an eccentric pin-receiving relief of an arcuate configuration, an open-end receiver for receiving the lug including an internal surface of a substantially funnel-form configuration which terminates in a lug-receiving seat within which the lug is nested as it is received by the receiver, and a lug-capturing mechanism including a spring-loaded, axially displaceable coupling pin supported in juxtaposition with the receiver, a latching mechanism for restraining the coupling pin against axial displacement, and a release mechanism for releasing the coupling pin in response to a nesting of the lug in the seat, as will hereinafter become more readily apparent by reference to the following description and claims in light of the accompanying drawings.

DESCRIPTION OF THE PREFERRED EMBODIMENT

Figure 1:
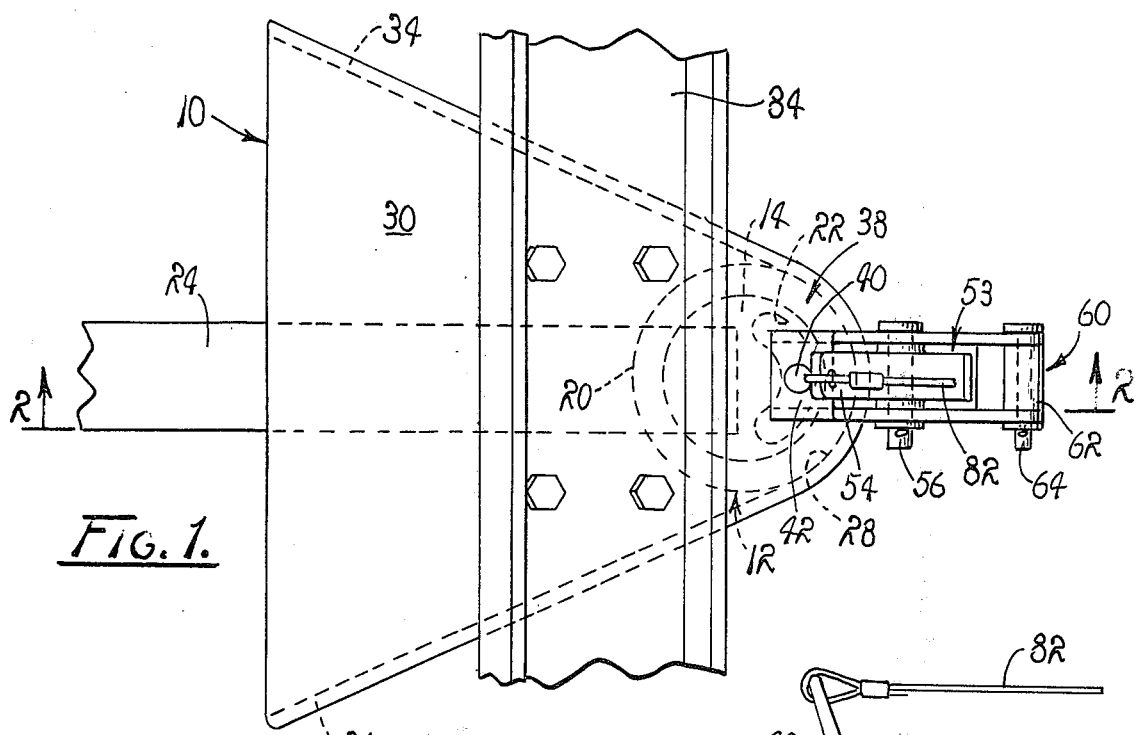
FIG. 1 is a top plan view of a self-coupling hitch which embodies the principles of the instant invention.
Figure 2:
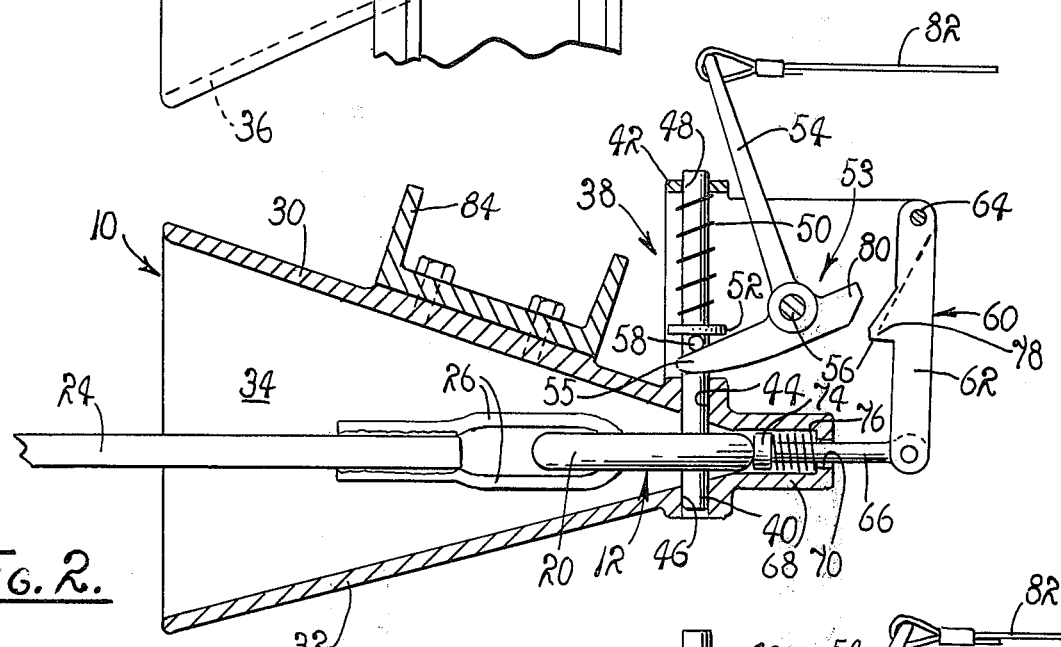
FIG. 2 is a cross-sectional view, taken generally along line 2—2 of FIG. 1.

Referring not to the drawings, with more particularity, wherein like reference characters designate like or corresponding parts throughout the several views, there is shown in FIG. 1 a self-coupling hitch which embodies the principles of the instant invention.

Figure 4:
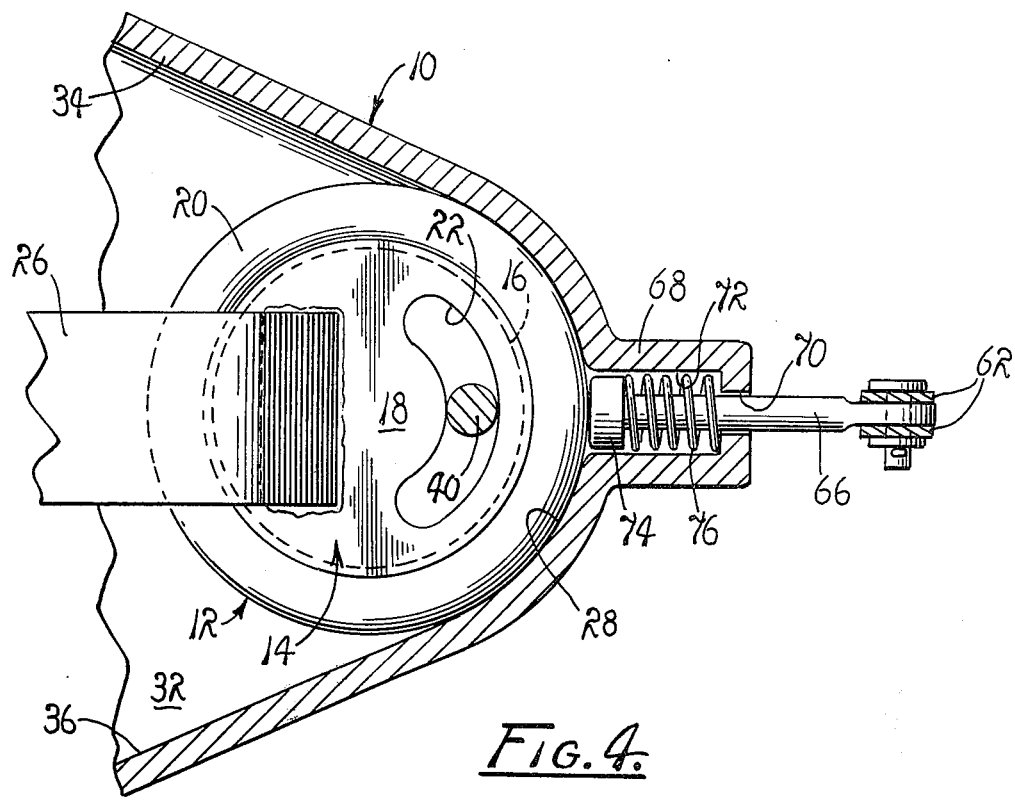
FIG. 4 is a horizontally sectioned plan view of the hitch.
Figure 5:
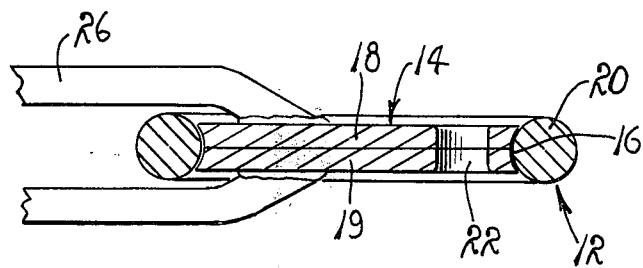
FIG. 5 is a fragmented, vertically sectioned view of the lug shown in FIGS. 1 through 4.

As illustrated in the drawings, the hitch includes a receiver, generally designated 10, within which a lug, generally designated 12, is received for effecting a coupling of vehicles, not shown. The lug 12, as best illustrated in FIGS. 4 and 5, includes a center body 14, of a disk-shaped configuration, circumscribed by an annular groove defining a bearing surface 16 having a substantially U-shaped cross-sectional configuration, as illustrated in FIG. 5. As a practical matter, the center body 14 is formed by superimposing two plates 18 and 19 and welding them together in selected zones, not designated, in their plane of juncture.

Within the bearing surface 16, there is seated an annular bearing 20 supported for displacement in an annular path which circumscribes the center body 14. It will, therefore, be understood that the annular bearing 20 is concentrically related to the center body 14 and is supported within the bearing surface 16 in a manner such that it is free to rotate about an axis coincident with an axis of symmetry normally related to the plane of the center body 14.

Within the center body 14 there is defined an eccentrically related, pin-receiving relief 22 of a substantially arcuate configuration. The center body 14 is adapted to be affixed to the distal end of a tongue or connecting link 24 projected from a towable vehicle, not shown. In order to affix the lug 12 to the tongue 24, there is provided a bracket including arms 26 having one end thereof welded or otherwise suitably secured to the center body 14 and the opposite end thereof welded or otherwise suitably secured to the tongue 24. The arms of the bracket 26 are suitably configured for accommodating a welding of adjacent ends thereof to the plates 18 and 19 without impeding the rotation of the annular bearing 20.

The receiver 10, as shown, is of a funnel-form configuration and has an open-end and a substantially closed end. Within the closed end of the receiver there is defined a seat, designated 28, for receiving the lug 12 in a nested relationship. The receiver 10 includes a pair of upper and lower converging walls 30 and 32, respectively, and a pair of horizontally covering side walls 34 and 36, respectively. The side walls 34 and 36 are arcuately configured in the zone of their juncture for establishing the seat 28. It is important to note that the seat 28 has a radius of curvature substantially equal to the radius of the annular bearing 20. It will, therefore, be appreciated that as the lug 12 is caused to nest, that is to say, comes to rest, in a confined relationship with the seat 28, rolling motion of the annular bearing 20 relative to the contiguous surfaces of the receiver is arrested. Of course, with the annular bearing 20 thus nested within the seat 28, oscillatory motion of the center body 14 about an axis of rotation coincident with the aforementioned vertically oriented axis of symmetry is facilitated by the bearing sruface 16. Hence, the angular relationship between the tongue 24 and the receiver 10 is, in operation, varied as oscillatory motion is afforded the center body 14.

In order to achieve a coupling of the lug 12 with the receiver 10, there is provided a lug-capturing mechanism, generally designated 38, which serves to automatically capture the lug 14 as the lug is caused to seat in a nested relationship with the seat 28. The lug-capturing mechanism 38 includes an axially displaceable coupling pin 40 supported within a bracket 42 mounted on the receiver 10 in juxtaposition with the seat 28. As a practical matter, the upper and lower walls 30 and 32 of the receiver are provided with a pair of axially aligned bores 44 and 46, respectively, which serve to receive the coupling pin 40. Coaxially aligned with the pair of bores 44 and 46 there is a guide bore 48 formed in the bracket 42. This bore also receives and supports the coupling pin 40 and serves as a guide therefor, as rectilinear reciprocation is imparted to the coupling pin for extending and retracting the pin relative to the receiver 10.

The coupling pin 40 is spring-biased toward an extended disposition and into a seated relationship with the receiver through a compression spring 50 concentrically related to the coupling pin and interposed between a stop 52 formed on the coupling pin and seat, not designated, provided on the bracket 42 adjacent to the bore 48. Consequently, it will be appreciated that the coupling pin 40 continuously is urged in axial displacement, by the spring 50, toward a seated relationship with the receiver 10.

In order to retract the coupling pin 40 from a seated relationship with the receiver 10, there is provided a pin retractor, generally designated 53, which conforms substantially to the configuration of a bellcrank. The pin rectractor 53 includes a pair of angularly related arms 54 and 55 and is supported for pivotal oscillation by a pivot pin 56. The arm 55, as shown, is of a length adequate for engaging a pin 58 extended through the coupling pin 40, upon which rests the stop 52. Consequently, oscillatory motion imparted in a first direction to the retractor 53, about the pivot pin 56, causes the arm 55 to engage the pin 58 and impart a lifting motion thereto, against the applied forces of the spring 50. However, in the event the retractor 53 is released for oscillatory motion, the spring 50 becomes effective for imparting axial motion to the coupling pin 40 for thus causing it to advance axially toward a seated relationship within the receiver 10.

A latching mechanism 60 is provided for releasably securing the pin retractor 53 against oscillatory motion, in a first direction, about the pivot pin 56 for thus supporting the coupling pin 40 in its retracted relationship with respect to the receiver 10. The latching mechanism 60 includes a lever arm 62 having one end thereof pivotally connected to the bracket 42 by a suitable pivot pin 64, while the opposite end thereof is pivotally connected to a spring-loaded release pin 66, which, in turn, is supported by a suitable bracket 68, of a sleeve-like configuration, projected from the receiver 10 in coaxial alignment therewith.

In practice, the bracket 68 includes a bore 70 formed in its distal end in coaxial alignment with a bore 72 formed in the side walls 34 and 36, near their zone of juncture. The release pin 66 is provided with an impact head 74, urged toward an extended disposition within the receiver 10 by a compression spring 76. This spring is concentrically related to the release pin 66 and is interposed between the impact head 74 and an annular seat, not designated, defined on the bracket 68 adjacent to the bore 70.

Figure 3:
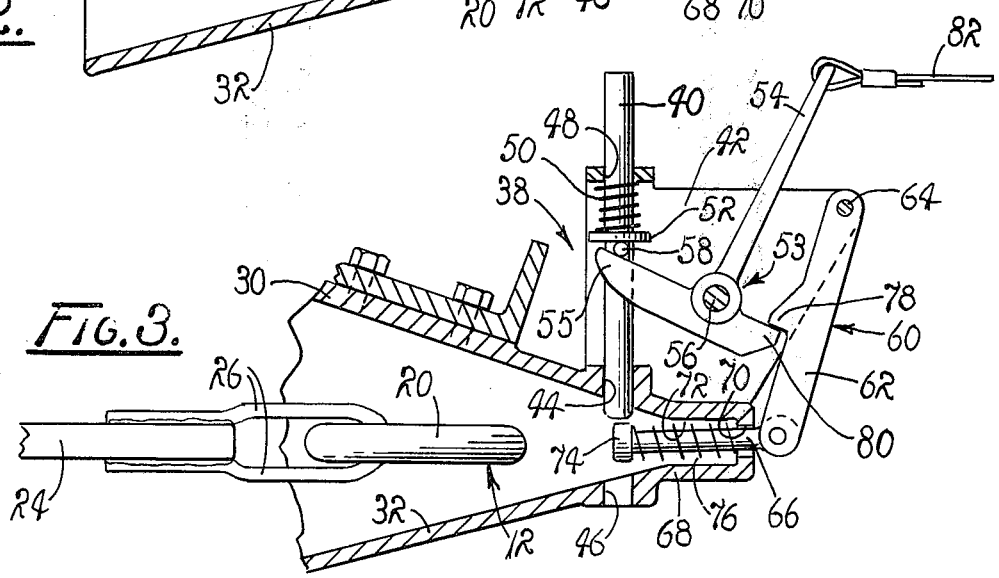
FIG. 3 is a fragmented cross-sectional view, similar to FIG. 2, illustrating a relationship of the lug, receiver, coupling pin and release pin prior to a nesting of the lug within the receiver.

Projected from the lever arm 62, near the midportion thereof, there is provided a protuberance which defines a tooth-like dog 78 facing the retractor 53. The retractor 53, in turn, is provided with a shoulder-like protrusion 80 defining a catch for receiving the dog 78, in an engaged relationship, as illustrated in FIG. 3. It should, therefore, be apparent that as the compression spring 76 serves to urge the release pin in axial displacement toward the receiver 10, the lever arm 62 is urged in angular displacement about the pivot pin 64 for thus positioning the dog 78 in a catch-receiving disposition, relative to the catch 80. Of course, once the coupling pin 40 is in a fully retracted disposition, the dog 78 and catch 80 are caused to engage in a mated relationship whereupon the coupling pin 60 is supported in its retracted position.

Oscillatory motion in a direction suitable for retracting the coupling pin 40 from the receiver 10 is imparted to the retractor 53 through a use of any suitable device. As shown, a cable 82 is secured to the distal end of the arm 54 whereby a suitable tensioning of the cable serves to displace the retractor 53 about the pin 56 for causing the arm 55 to engage and lift the pin 58 for thereby effecting retraction of the coupling pin 40 from the receiver 10. Thus the receiver is prepared to receive the lug 12.

As a practical matter, the hitch of the instant invention is employable with various types of towable vehicles including tractors, trucks and the like. Consequently, the receiver 10 is mounted in any suitable manner aboard a selected towing vehicle. For illustrative purposes only, there is shown a transversely oriented mounting beam 84 to which is bolted or otherwise suitably secured the receiver 10. If desired, the receiver 10 may be welded or otherwise directly secured to selected structure including a tow bar for a tractor, a chassis of a truck and similar supporting structure.

OPERATION

It is believed that in view of the foregoing description, the operation of the device will readily be understood and it will be briefly reviewed at this point.

With the receiver 10 supported aboard a selected towing vehicle and the lug 12 affixed to a connecting link or tongue projected from a towable vehicle, the hitch of the instant invention is readied for operation. Assuming that the receiver 10 and lug 12 are associated in an uncoupled relationship, the receiver 10 is prepared for receiving the lug 12 simply by tensioning the cable 82. As a tensioning force is applied to the cable 82 the retractor 53 is displaced in a first direction about the pivot pin 56, whereupon the distal end of the arm 55 of the retractor engages and lifts the pin 58. Lifting of the pin 58, of course, causes the coupling pin 40 to be retracted from the receiver 10, against the applied forces of the spring 50. As the retractor 53 is displaced, the compression spring 76 urges the release pin 66 toward its extended position relative to the receiver 10 for thus causing the lever arm 62 to position the dog 78 in coupling engagement with the catch 80. As a consequence of the engagement of the dog 78 with the catch 80 the coupling pin 40 is releasably secured against axial displacement towards its extended position relative to the receiver 10.

The towing vehicle upon which the receiver 10 is mounted is now advanced toward the lug 12. As the receiver is brought into close proximity with the lug 12, the annular bearing 20 engages either of the side walls 34. Due to the fact that the annular bearing 20 is afforded rotary motion, only rolling friction is encountered as the lug 12 advances toward a nested relationship with the seat 28. This rolling motion, of couse, permits the lug to be easily inserted into the receiver 10 with a mininal amount of force being transferred to the tongue 24 and, similarly, only a minimum reactive force being applied by the tongue to the walls 34 and 36 of the receiver. Thus, the tongue becomes aligned with substantial ease, with the receiver 10, while the receiver experiences minimal impact damage.

As the annular bearing facilitates advancement of the lug 12 toward the seat 28, the peripheral surface of the annular bearing 20 engages the impact head 74 of the release pin 76. Continued motion of the lug 12, toward its nested relationship with the seat 28, causes the release pin 66 to be displaced forcibly in a retracting direction against the applied forces of the compression spring 76. Such displacement of the release pin causes the lever arm 62 to be displaced through a distance suitable for disengaging the dog 78 from the catch 80, as a nesting of the lug 12 within the seat 28 is completed.

Of course, once the dog 78 and the catch 80 are disengaged, the spring 50 becomes effective for imparting axial displacement to the coupling pin 40 for thereby forcing the coupling pin toward its extended position, relative to the receiver 10, along a patch projected through the relief 22 and the bore 46. Thus, a coupling of the receiver 10 and lug 12 is achieved.

It should be apparent that in towing the vehicle, pivotal motion of the tongue 24 about the coupling pin 40 is accommodated due to the collective effects of the annular bearing 20 and the arcuate configuration of the pin-receiving relief 22, even though the forwardmost end of the lug 12 is nested in the seat 28 and supported thereby against lateral motion.

In view of the foregoing, it should readily be apparent that the hitch of the instant invention provides a practical solution to the problem of providing a practical and economic self-coupling hitch which can be safely and efficiently employed in achieving a coupling towable vehicle a towable with a towing vehicle.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by letters Patent is:

1. An improved self-coupling hitch particularly suited for coupling towable vehicles with towing vehicles comprising:

A. a lug including a center body of a substantially circular configuration adapted to be rididly affixed to the distal end of a connecting link projected from a towable vehicle and characterized by means defining about the periphery thereof an annual bearing surface having an arcuate cross-sectional configuration and an annular bearing seated in the annular bearing surface, and supported thereby for angular displacement with respect to said center body;

B. an open-end receiver for receiving said lug adapted to be mounted on a towing vehicle; and C. lug-capturing means mounted in juxtaposition with said receiver for capturing said lug in response to an introduction of the lug into the receiver.

2. The hitch of claim 1 wherein said receiver includes means defining therewithin an internal surface of a substantially funnel-form configuration terminating in a curved segment defining an arcuate seat for receiving said lug with the annular bearing seated in a mated relationship therewith.

3. The hitch of claim 2 wherein said lug-capturing means includes a coupling pin supported for axial movement along a linear patch extended through said receiver, and said lug includes means defining within said center body a pin-receiving opening extended therethrough and adapted to be brought into coaxial alignment with said coupling pin as the annular bearing is seated in a mated relationship with said arcuate seat.

4. The hitch of claim 3 wherein said pin-receiving opening is of an arcuate configuration concentrically related to the center of said center body, and said arcuate seat is of configuration having a radius of curvature substantially equal to the radius of the periphery of said annular bearing.

5. The hitch of claim 3 wherein said lug-capturing means further includes biasing means for continuously urging said coupling pin in axial displacement, and operable latching means for releasably restraining said coupling pin against axial displacement.

6. The hitch of claim 5 wherein said lug-capturing means further includes pin-release means connected to said latching means for releasing said coupling pin from restraint in response to a reception of said lug within said receiver.

7. The hitch of claim 6 wherein said pin-release means includes a spring-loaded release pin extended through said arcuate seat and connected with said latching means, engageable with said annular bearing and displaceable thereby for releasing said latching means.

8. An improved self-coupling hitch for releasably coupling towable vehicles having a connecting link extended therefrom with a selected towing vehicle comprising:

A. a lug of a substantially disk-shaped configuration adapted to be mounted on a connecting link extended from a towable vehicle including a center body of a circular configuration, an annular bearing supported by said center body for circular motion about the periphery thereof and means defining in said center body a pin-receiving relief of an arcuate configuration eccentrically related thereto;

B. an open-end receiver including an internal surface of a substantially funnel-form configuration terminating in a lug-receiving seat for receiving said lug in a nested relationship having a radius of curvature substantially equal to the radius of said annular bearing; and C. lug-capturing means including a spring-loaded coupling pin supported in juxtaposition with said receiver for axial displacement along a path extending through said relief, when said lug is received in said seat, latch means for restraining said coupling pin against axial displacement, and release means including a release pin extended into said receiver and connected with said latch means for releasing said coupling pin in response to a reception of said lug by said seat.

* * * * *

UNITED STATES PATENT OFFICE
CERTIFICATE OF CORRECTION

Patent No. 3,912,302                Dated October 14, 1975

Inventor(s) Ethredge T. Patterson

It is certified that error appears in the above-identified patent and that said Letters Patent are hereby corrected as shown below:

Column 2, line 57, delete "not" and insert ---now---.

Column 6, line 31, after "achieving a coupling" insert

---of a---; and line 32, after "vehicle" delete "a towable".

Signed and Sealed this twenty-third Day of December 1975

[SEAL]

Attest:

RUTH C. MASON
*Attesting Officer*

C. MARSHALL DANN
*Commissioner of Patents and Trademarks*